United States Patent [19]

Prengel et al.

[11] Patent Number: 5,223,360
[45] Date of Patent: Jun. 29, 1993

[54] MATERIALS COATED WITH PLATE-LIKE PIGMENTS

[75] Inventors: Constanze Prengel, Weiterstadt; Klaus-Dieter Franz, Kelkheim; Hartmut Härtner, Mühltal; Manfred Kieser, Darmstadt; Axel von Daacke, Munich; Klaus Bernhardt, Gross Umstadt, all of Fed. Rep. of Germany

[73] Assignee: Merck Patent Gesellschaft mit beschrankter Haftung, Darmstadt, Fed. Rep. of Germany

[21] Appl. No.: 612,690

[22] Filed: Nov. 15, 1990

[30] Foreign Application Priority Data

Nov. 16, 1989 [DE] Fed. Rep. of Germany ....... 3938055

[51] Int. Cl.$^5$ .................. G03G 17/00; B32B 3/00; B05D 5/06
[52] U.S. Cl. .................... 430/39; 430/10; 428/207; 428/324; 427/331; 427/372.2; 427/487; 427/500; 427/511; 427/514
[58] Field of Search ............. 430/39, 10, 644; 428/207, 324; 427/26, 331, 372.2, 500, 487, 511, 514

[56] References Cited

U.S. PATENT DOCUMENTS

| | | | |
|---|---|---|---|
| 1,886,972 | 11/1932 | Payne | 428/207 |
| 3,650,885 | 3/1972 | Nass et al. | 430/281 |
| 4,744,832 | 5/1988 | Franz et al. | 428/324 |
| 4,756,951 | 7/1988 | Wang et al. | 428/207 |
| 4,801,392 | 1/1989 | Adair et al. | 522/25 |
| 5,008,143 | 4/1991 | Armanini | 428/207 |

FOREIGN PATENT DOCUMENTS

| | | | |
|---|---|---|---|
| 52-10148 | 1/1977 | Japan . | |
| 56-017370 | 2/1981 | Japan | 430/39 |

*Primary Examiner*—Marion E. McCamish
*Assistant Examiner*—Christopher D. RoDee
*Attorney, Agent, or Firm*—Millen, White, Zelano & Branigan

[57] ABSTRACT

Materials coated with plate-like pigments and characterized in that the coating shows structuring in defined areas due to a difference in the orientation of the pigment particles are highly suitable in the area of general security printing.

17 Claims, No Drawings

MATERIALS COATED WITH PLATE-LIKE PIGMENTS

SUMMARY OF THE INVENTION

The invention relates to materials coated with plate-like pigments, characterized in that the coating shown structuring in defined areas, due to a difference in the orientation of the pigment particles.

The age of ultramodern photocopying technology increasingly requires the provision of new and improved materials in the area of security printing. In particular since the introduction of color copiers, many efforts have been made to develop security inks for copying protection. Therefore, there is a large demand for materials of this type, in particular those which can be easily and durably applied to, for example, plastic, paper or paper-like substrates, and give any structuring desired, which, due to the specific optical properties of the applied material, leads however to forge-proof or photocopy-proof documents.

This object was achieved by the present invention.

Surprisingly, it has been found that by means of plate-like pigments copy-proof optical structures can be produced in a simple and durable manner by coating a material with the pigments such that the pigment particles are initially free to move, then producing in defined areas a different orientation of the pigment particles, and finally fixing all pigment particles in the coating.

Accordingly, the invention relates to materials coated with plate-like pigments, characterized in that the coating shows structuring in defined areas, due to a difference in the orientation of the pigment particles.

The invention also relates to a process for the preparation of materials coated with plate-like pigments, in which the coating shows structuring, characterized in that the material is coated with a formulation containing plate-like pigments in which the pigment particles are initially mobile, a difference in the orientation of the pigment particles is then produced in defined areas by external effects, and finally all pigment particles are fixed in the coating.

The invention finally relates to the use of materials of this type in the area of general security printing.

Plate-like pigments are understood to mean any lustrous plate-like substrates, such as lustrous sheet silicates, and oxides or materials coated with oxides, such as mica, talc, kaolin or other comparable minerals, but also plate-like iron oxide, bismuth oxychloride, basic lead carbonate and the micas coated with metal oxide and known as nacreous pigments, and aluminium platelets and oxide-coated aluminium platelets.

Any conventional nacreous pigments can be used, for example micas coated with colored or colorless metal oxides, such as $TiO_2$, $Fe_2O_3$, $SnO_2$, $Cr_2O_2$, ZnO and other metal oxides, by themselves or in a mixture in a uniform layer or in subsequent layers. These pigments are known, for example, from German Patents and Patent Applications 1,467,468, 1,959,998, 2,009,566, 2,214,545, 2,215,191, 2,244,298, 2,313,331, 2,522,572, 3,137,808, 3,137,809, 3,151,343, 3,151,355, 3,211,602 and 3,235,017. Furthermore, the plate-like substrates mentioned can also be coated with organic dyes or pigment molecules.

Plate-like, magnetically alignable pigments are understood to mean all plate-like substrates mentioned which contain a magnetically alignable component.

The substrates may be provided in a suitable manner with a magnetically alignable component, for example by mixing or selective coating. Of the magnetic components, such as are described, for example, in Holleman-Wiberg, Lehrbuch der Anorganischen Chemie (Textbook of Inorganic Chemistry), 91st–100th editions, Walter de Gruyter, Berlin, New York 1985, p. 986–995, in particular the ferro- and ferrimagnetic substances, for example ferrites of the $M(II)O \times Fe_2O_3$ type, where M(II) is Mn, Fe, Co, Ni, Cu, Zn, Mg or Cd or furthermore also other magnetic iron oxides are suitable.

For the magnetically alignable pigments, the substrates which are used are preferably the customary nacreous pigments, for example micas coated with colored or colorless metal oxides, such as $TiO_2$, $Fe_2O_2$, $SnO_2$, $Cr_2O_3$, ZnO and other metal oxides, by themselves or in a mixture in a uniform layer or in subsequent layers. Accordingly, all materials which carry interference colors, are iridescent and can be oriented in a magnetic field are particularly preferred. When the substrates are coated with the magnetic component, in particular coatings containing iron(II) oxide are preferred.

According to German Offenlegungsschrift 3,617,430, plate-like pigments containing iron(II) oxide which have high luster and the interference colors thin films are available. A magnetite layer can be deposited on a suitable plate-like substrate either directly by wet chemical methods or, alternatively, the plate-like substrate can first be coated with iron(III) oxide which is subsequently reduced to a layer containing iron(II) oxide.

The materials according to the invention can be prepared by various methods. First the support material itself, for example metal, plastic, glass, ceramic or paper is coated with the plate-like pigment such that the pigment is evenly distributed on the surface of the material. For this purpose, the pigment is preferably dispersed in a curable medium and applied to the support material, for example sprayed onto it or applied to it by means of a knife. Suitable curable media are all conventional ink and paint formulations known to a person skilled in the art, such as printing inks, in particular security printing inks, in general meltable printing inks, printing inks based on acrylate or polyester, amino, alkyd, acrylic, epoxy, alkyd/melamine, acrylic/melamine, polyester/-melamine resins or also natural resins, such as nitrocellulose, polyurethane or comparable paints and paint systems, furthermore also water-soluble systems or systems which can be diluted with water or dispersions of the systems mentioned. The handling and processing of polymers and resins is described, for example, by J. A. Prane in "Introduction to Polymers and Resins", published by the Federation of Societies for Coatings Technology, Philadelphia, USA 1986, and the references cited therein.

The pigment-coated materials are then structured in a suitable manner. This can be done by various methods. Depending on the nature of the pigments, the structuring can be produced either by curing defined areas in periodical intervals or by orienting pigment particles in a defined area.

For the first process, virtually all the pigments mentioned can be used. For example, these pigments, when incorporated in a radiation-curable paint system, can produce structuring by selective irradiation of defined areas.

If, for example, a UV-curable paint system is used and the coated material is exposed through a photomask the structure of the mask can surprisingly be recognized on the surface of the material. The remaining portion, if appropriate after producing one or more further structures by the process mentioned, is then cured. The presence of optical structures, as shown by microscopic photographs, is caused by the difference in orientation of the pigment particles to one another, in particular in the boundary region between exposed and unexposed coatings. The curing is conventional. See, e.g., "UV Curing: Science and Technology", Technology and Marketing Corp., 642 Westover Road, Stamford, CT, USA.

After complete curing, the structures are fixed relief-like and give a clear three-dimensional impression. Writing produced, for example, on paper by the process mentioned is copy-proof, and a color photocopy can easily be distinguished from the original. Examples of suitable UV-curable binder systems have been publicized by K. Dorfner and J. Ohngemach in a talk given at the "Radcure Conference", Sep. 10–13, 1984, Atlanta, Georgia, USA.

When heat-curable systems are used, the curing steps can be carried out successively by using heatable metal half-tone screens or stencils. Furthermore half-tone screens or stencils manufactured from screening materials which absorb heat or IR radiation can also be used. The uncovered portions of the structures can then be cured by means of IR light. In a subsequent step, the covered portions are then cured.

If the pigments used are magnetically alignable, the structuring can alternatively be produced by applying magnetic fields. This can in turn be done by various processes.

One consists in carrying out the structuring by direction inscription using a permanent magnet, for example, by moving the magnet over the material (magnetic ballpoint pen) or moving the material under a fixed magnet. Furthermore, both components can also be moved with respect to one another. On the other hand, structures can also be produced by means of a stencil comprising a magnetic shielding material. A wide range of shielding materials are available to persons skilled in the art, such as are described, for example, in the in-house publication of Vacuumschmelze GmbH, "Magnetische Abschirmungen" (Magnetic Shields), Hanau, edition of 1975 and references cited therein. A part from theoretical information, it contains in particular valuable practical information on available soft magnetic materials and their application. To shield small and medium scattering fields, the materials made of MUMETALL® or VACOPERM® 100 are mainly used. Depending on the desired structure, foils, ribbons or strips of these materials can be produced and cut to size individually. The alignment of the particles by magnetic force is in principle instantaneous. Of course, the degree of alignment especially in thicker layers will depend on time and magnetic force. These parameters depend on the effect the user wishes to obtain, and are determinable by routine experimentation.

A further possibility of producing the materials according to the invention involves indirect structuring, for example in a UV-curable medium analogously to the process described above. In this method, the entire pigment coating is first uniformly magnetically aligned. It is then exposed through a photomask. By curing the exposed area, the negative of the mask structure has been inscribed in the surface in the form of magnetic information. In the unexposed, uncured portion of the surface, it is then possible to carry out a magnetic reorientation by one of the methods mentioned or even a demagnetization, so that eventually, after the entire surface has been cured, all structural patterns produced are present in "frozen" form. Alternatively it is also possible to expose an unmagnetized surface through a photomask, so that the cured portion does not contain any magnetic information in the abovementioned sense. Analogously, the unexposed not yet cured areas can be structured by the method mentioned. The appearance of a surface coated with a lacquer or paint or any other coating which contains flaky effect pigments largely depends on the orientation of the pigment in the coating. Irradiation of a given area does not cause the pigments to align in a particular direction, but freezes the then specific situation of alignment in this area. The pigments in other areas are still mobile and continue to align. Just freezing (hardening) different areas at different times leads to the effect of a different appearance of these areas.

Depending on the particular use, the individual steps of the processes mentioned can be combined with one another in a suitable manner, so that eventually optical and magnetic information can be present separately or simultaneously side by side.

The materials according to the invention are, therefore, distinguished by a number of advantages. On the one hand, inscribed magnetic information can also be perceived optically at the same time, while, on the other hand, the optical overall impression, i.e., the structure in combination with luster or nacreous luster cannot be photocopied. This excellent property makes the materials according to the invention suitable for a wide range of applications in the area of security printing. Thus, for I0 example, banknotes, check cards and check forms, credit cards, identification papers or documents, such as certificates, shares or other security papers, Lotto coupons, stamps and the like can be marked forge-proof by the process according to the invention.

The magnetic information of a surface structured according to the invention can also be used as magnetically readable code, for example on check cards.

Furthermore, the process according to the invention also makes it possible to produce writing or pictures of any kind on various support materials, such as glass, metal, paper, ceramic and the like for advertising purposes, information boards and artistic or decorative purposes or any other areas of application, such as are described, for example, in German Offenlegungsschrift 3,732,116.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, if any, cited above and below, and of corresponding application Federal Republic of Germany P 39 38 055.6, filed Nov. 16, 1989, are hereby incorporated by reference.

EXAMPLES

Example 1

Preparation of a magnetically alignable pigment a) 10 kg of mica are suspended in 200 l of fully deionized water and heated to 80° C. This suspension is then acidified with 37% hydrochloric acid such that a pH between 3 and 4 is reached. 27 l of a solution of 845 ml of iron(III) chloride, 750 ml of titanium(IV) chloride solution (360 g of $TiCl_4$/l) and 75 ml of concentrated sulfuric acid in 30 l of deionized water are then metered into the mica suspension over a period of 50 minutes with vigorous stirring. The pH is maintained in the pH interval 3–4 with 32% sodium hydroxide solution. After the addition is complete, stirring is continued for 30 minutes, and a pH between 8 and 9 is then established with 32% sodium hydroxide solution, and 1 kg of potassium nitrate is added to the suspension. A solution of 30 kg of iron(II) sulfate, 2 kg of potassium nitrate and 300 ml of concentrated sulfuric acid in 100 l of deionized water is then metered in, while passing nitrogen through the suspension, until the suspension turns blue (magnetite). The pigments are filtered off, washed with deionized water and dried at 100° C. for 16 hours.

b) The magnetite/mica pigments thus prepared are ignited at 400°–900° C. or irradiated with microwaves. This changes not only the color of the pigment with increasing iron(III) oxide content continuously from black to red-brown but also the interference color of the starting pigment, for example from red to violet or from blue to green.

c) Alternatively, a magnetite/mica pigment is prepared by partial reduction of a mica/α-iron(III) oxide pigment by the method of German Offenlegungsschrift 3,617,430.

Example 2

A mixture of the magnetite/mica pigment (1% by weight of pigment) prepared according to Example 1a in a nitrocellulose-acrylic paint (components: 0.5 kg of collodion wool E 1160 from Wolff and Co., Walsrode, 2.1 kg of n-butyl acetate, 1.5 kg of ethyl acetate, 0.65 kg of Acronal ® 700 l from BASF, Ludwigshafen, and 0.6 kg of toluene) is prepared. A draw-down of the mixture on a paperboard strip is produced. The still wet paperboard strip is then placed on a stencil made of MUMETALL ® foil. Under the foil, a magnetic field (strength: 0.2–0.3 T) is applied. This causes the uncovered pigment particles to become oriented. In the dried paint film, the structure produced remains intact.

Example 3

Example 2 is repeated, except that a draw-down of the mixture on an aluminium sheet is produced which results also in this case, after curing of the paint, in fixing of the inscribed structure.

Example 4

A paperboard strip as described in Example 2 is coated. Pigment particles are then aligned by moving a mobile permanent magnet over the strips. The writing or the inscribed picture remain unchanged after curing of the film.

An aluminium sheet coated according to Example 3 is structured analogously.

Example 5

Analogously to Example 2, paperboard strips are treated with the pigments prepared according to Example 1b. The structuring is likewise clearly visible.

Example 6

1.5 g of a pigment prepared according to Example 1a are suspended in 20 g of the oligomeric epoxy acrylate system Laromer ® LR 8555 (BASF, Ludwigshafen) with the admixture of 1 g of the initiator system Darocur ® 1664 (Merck, Darmstadt), and the suspension is homogenized by means of a paint stirrer over a period of 5 minutes. After letting it stand for 5 minutes for deaeration, an approximately 15 cm long and 250 μm thick draw-down is prepared on a glass plate (10×20 cm). The glass plate is placed with the coated side underneath on a metal sheet equipped with spacers. A mask containing the cutout writing "Merck" is placed directly onto the upper side of the glass plate, which is then exposed to a UV lamp (Beltron HOK-2) at a distance of 40 cm for 15 s. The pigment particles in the unexposed paint film zones are then uniformly aligned by means of a magnet (diameter about 6 cm; magnetic induction about 0.2–0.3 T). The writing "Merck" was clearly legible and is fixed after curing of the paint film strip mentioned. A photocopy produced by a color copier substantially differs from the original by a lack in gloss and poor legibility.

Example 7

A mixture of 1 g of a pigment prepared according to Example 1 a, 20 g of Laromer ® EA 81 (BASF, Ludwigshafen) and 1 g of Darocur ® 1664 (Merck, Darmstadt) is. prepared and homogenized by means of a paint stirrer over a period of 5 min. After letting it stand for 10 minutes for deaeration, an approximately 50 μm thick draw-down is produced on cardboard (75×175 mm). A glass plate equipped with spacers and letters (MERCK) pasted onto it is placed on top of the cardboard. Analogously to Example 6, it is then exposed for 3–5 sec. The structuring in the paint system is already observed now. The pigment particles are then aligned in the unexposed area by means of a magnet (0.2–0.3 T) and then exposed. The writing is now clearly legible and is fixed. A photocopy produced with a color copier substantially differs from the original, as described in Example 6.

Analogously, a Japanese cardboard of dimensions 100×190 mm (available from k Japan Ltd., Tokyo) is structured.

Example 8

A mixture of 1 g of Iriodin ® 225 (flaky mica pigment coated with $TiO_2$ from Merck, Darmstadt), 20 g of Laromer ® EA 81 and 1 g of Darocur ® 1664 is prepared analogously to Example 7 and drawn down on a cardboard and exposed as described there. After the exposure, the structure already becomes clearly visible. Finally, the still unexposed portion is also treated as above. Clearly legible writing having a three-dimensional effect is obtained.

Iriodin ® 504 (flaky mica pigment coated with $Fe_2O_3$ from Merck, Darmstadt) is used analogously to give the same result.

In these two systems, too, photocopies can be easily distinguished from the original.

The preceding examples an be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A material having a coating of particles of at least one platelet-shaped, nacreous pigment, wherein the coating has structuring in defined areas due to a difference in orientation of the pigment particles, and the material exhibits a visible, non-photoreproducible image.

2. A material according to claim 1, wherein the pigment particles are magnetically alignable.

3. A material according to claim 2, comprising a magnetic iron oxide.

4. A material according to claim 3, wherein the magnetic iron oxide is a ferrite of the formula $M(II)O \times Fe_2O_3$, wherein M(II) is Mn, Fe, Co, Ni, Cu, Mg or Cd.

5. A material according to claim 1, wherein the pigment particles comprise mica coated with at least one metal oxide.

6. A material according to claim 5, wherein the pigment particles comprise mica coated with $TiO_2$, $Fe_2O_3$, $SnO_2$, $Cr_2O_3$, ZnO or a mixture thereof.

7. A material according to claim 5, comprising a magnetic iron oxide.

8. A material having a coating of magnetically alignable particles of at least one platelet-shaped, nacreous pigment, wherein the coating has structuring in defined areas due to a difference in orientation of the pigment particles, whereby a visible, non-photoreproducible image is formed.

9. A process for the preparation of a material containing a visible, non-photoreproducible image, comprising coating a substrate with a layer of mobile, platelet-shaped, nacreous pigment particles, producing at least one area of distinct particle orientation in said pigment particles, and immobilizing the particle layer, whereby the resultant material has a visible, non-photoreproducible image.

10. A process according to claim 9, wherein the area of distinct orientation contains aligned pigment particles.

11. A process according to claim 9, wherein the area of distinct orientation contains non-aligned pigment particles.

12. A process according to claim 9, wherein the pigment particles are dispersed in a curable medium.

13. A process according to claim 12, wherein the curable medium is a printing ink.

14. A process according to claim 12, wherein the coated substrate is exposed to radiation through a photomask, and subsequently cured.

15. A process according to claim 12, wherein said area of distinct orientation is produced by magnetically aligning the pigment particles of said section.

16. A process for the preparation of a material containing a visible, non-photoreproducible image, comprising coating a substrate with a layer of mobile, platelet-shaped, nacreous pigment particles, producing at least one area of distinct particle orientation in said pigment particles by magnetically aligning the particles in said area, and immobilizing the particle layer, whereby the resultant material has a visible, non-photoreproducible image.

17. A material having thereon a visible, non-photoreproducible image produced by the process of claim 16.

* * * * *